United States Patent [19]
Hoppe et al.

[11] Patent Number: 5,741,602
[45] Date of Patent: Apr. 21, 1998

[54] HEAT-CURABLE COATING COMPOSITION COMPRISING PLURALITY OF BINDER RESINS

[75] Inventors: Manfred Hoppe; Andreas Kaplan; René Gisler, all of Chur, Switzerland

[73] Assignee: EMS-Inventa AG, Zurich, Switzerland

[21] Appl. No.: 518,273

[22] Filed: Aug. 23, 1995

[30] Foreign Application Priority Data

Aug. 26, 1994 [DE] Germany .......................... 44 30 400.5

[51] Int. Cl.$^6$ .............. B32B 27/36; B05D 1/06; B05D 1/24; C08G 63/685
[52] U.S. Cl. .......... 428/482; 427/185; 427/195; 427/459; 427/460; 427/461; 427/485; 525/437; 525/444; 528/288; 528/291; 241/24.28
[58] Field of Search .......... 428/480, 482; 427/180, 185, 189, 195, 458, 459, 475, 460, 461, 485; 528/288, 292, 291, 296; 525/418, 420, 437, 448, 444; 241/24–28

[56] References Cited

U.S. PATENT DOCUMENTS

| | | | |
|---|---|---|---|
| 3,842,035 | 10/1974 | Klaren | 260/47 EN |
| 4,371,638 | 2/1983 | Bernelin et al. | 523/427 |
| 4,414,279 | 11/1983 | Bernelin et al. | 428/413 |
| 4,801,680 | 1/1989 | Geary et al. | 528/272 |
| 5,264,529 | 11/1993 | Nozaki et al. | 525/438 |
| 5,266,657 | 11/1993 | Hammerton et al. | 525/437 |
| 5,321,063 | 6/1994 | Shimada et al. | 524/37 |
| 5,393,846 | 2/1995 | Hammerton et al. | 525/374 |

FOREIGN PATENT DOCUMENTS

| | | |
|---|---|---|
| 0 322 834 | 12/1988 | European Pat. Off. . |
| 0 366 608 B1 | 10/1989 | European Pat. Off. . |
| 0 471 409 A1 | 8/1991 | European Pat. Off. . |
| 0 520 429 A2 | 12/1992 | European Pat. Off. . |
| 0 582 363 A1 | 2/1993 | European Pat. Off. . |
| 23 24 696 | 5/1973 | Germany . |
| 32 32 463 A1 | 9/1982 | Germany . |
| 05-209138 | 8/1993 | Japan . |
| WO 91/14745 | 10/1991 | WIPO . |
| WO 94/03545 | 2/1994 | WIPO . |

OTHER PUBLICATIONS

Database Wpi, Derwent Publications Ltd., No. 89–156134, Apr. 17, 1989.

*Primary Examiner*—Vivian Chen
*Attorney, Agent, or Firm*—Browdy and Neimark

[57] ABSTRACT

A heat-curable, epoxy-free coating composition comprises a dry blend of at least two different binder resins, each binder resin comprising of (a) a carboxyl-terminated polyester resin having an acid value from 20 to 200 mg KOH/g and a glass transition temperature of at least 40° C., and (b) a β-hydroxylalkylamide with at least two β-hydroxylalkylamide groups per molecule; the at least two different binder resins differing in functionality, or in other words in the number of carboxyl and/or β-hydroxylalkylamide groups per binder resin molecule. Along with the binder resins, the coating composition optionally includes further additives that are typical for the processing and use of powder coatings.

20 Claims, No Drawings

HEAT-CURABLE COATING COMPOSITION COMPRISING PLURALITY OF BINDER RESINS

FIELD OF INVENTION

The invention relates to heat-curable coating compositions on the basis of carboxyl-terminated polyester resins, carboxyl-group- containing blocked polycyanates, and β-hydroxyalkylamides.

BACKGROUND

When heat-curable resin powder coatings are applied, they do not give off any organic solvents and therefore have clear ecological advantages over liquid coating compositions such as paints. The cross-linking of such resins under heat takes place by way of polyaddition or polycondensation reactions between the functional groups contained in the resin binders. Typical binder systems are epoxy resins/ curing agents; carboxyl- polyester/epoxies, hydroxyl-polyester/isocyanates, hydroxyl- acrylates/isocyanates, carboxyl-acrylates/epoxies, epoxy-acrylates/dicarboxylic acids, carboxyl-polyester/ or carboxyl- acrylates/b-hydroxyalkylamides, and so forth. The various binder systems differ from one another not only in their technical properties as paints and coated layers, but especially in their resistance to outdoor weathering, but all have high-gloss surfaces, or in other words a gloss index of>80 (DIN 67530, angle of incidence 60°).

There is presently an increasing need for coated layers from powder with semigloss or matt surfaces with a gloss index (DIN 67530) of<60 at an angle of incidence of 60° and good weather resistance for applications such as architecture, automobiles, and furniture.

The matting additives usual in the liquid paint industry, such as chalks, finely dispersed silicic acids and oxides, talc, etc., exhibit only a very slight matting effect in surface coatings applied in the form of powders, and when added in relatively large quantities they make the technical properties for painting purposes unacceptably worse. With additives that are incompatible with the binder, such as waxes, etc., so-called silken-sheen surfaces (gloss index per DIN 67530>60 at an angle incidence of 60°) can be attained; nevertheless in actual use the enrichment of incompatible additives has undesirable effects on the surface.

German Patent Disclosure DE-A 2 324 696 proposes a process for preparing matt coatings by using a special curing agent that reacts with epoxy groups, the agent being the salt of cyclic amidines, with certain polycarboxylic acids. Cross-linking of the powder coating occurs in this process with differing reactivities at different temperatures, and as a result microstructures that have a matt surface form on the surface of the coating. However, the use of this process is limited to epoxy- and carboxyl-polyester/epoxy powdered paints, and therefore powder coatings with adequate outdoor weathering resistance cannot be produced by this process.

European Patent Disclosure EP 0 366 608 B1 also proposes a process for producing powder coatings with matt surfaces. It relates to powdered paints based on epoxy resins or epoxy compounds, such as triglycidylisocyanurate (TGIC) with carboxyl- terminated polyester resins, and mixtures of di-, tri- or tetrakis-(B-carboxyethyl)cyclo-hexanones, or di-, tri- or tetrakis-(B-carboxyethyl)-cyclopentanones. The matt effect is ascribed here to the differing reactivity between the aliphatic carboxyl groups of the cross-linking agent and the aromatic carboxyl groups of the carboxyl-terminated polyester resin.

Another prior document, German Patent Disclosure DE-A 3 232 463, describes coatings with matt surfaces from a powder obtained by coextrusion of hydroxyl-terminated polyester resins, epoxy compounds such as TGIC, and special reversibly blocked polyisocyanates with free carboxyl groups.

In EP-0 582 363 A1 and WO-A 94/03545, which describe powder coatings on the basis of carboxyl-terminated polyester resins β-hydroxyalkylamides as cross-linking agents, it has already been proposed that instead of tetrafunctional β-hydroxyalkylamides, mixtures with a functionality of>3 and<3 be used, but the object or the outcome of these patent disclosures is not to produce powder coatings with matt surfaces but rather to attain better surfaces, even in greater film thicknesses, without microscopic pinholes (or blisters). Powder coatings produced by the teachings of these two patent references, or in other words by coextrusion of all the components, have a high gloss index in accordance with DIN 67530 of>80 at an angle of incidence of 60°.

SUMMARY OF INVENTION

An object of the invention is to overcome deficiencies in the prior art, such as mentioned above, and especially to make available an epoxy-free, heat-curable binder system that is absolutely unobjectionable toxicologically and can be used to produce weather-resistant protective coats with matt surfaces.

This object is attained by the heat-curable, epoxy-free coating composition for preparing matt coatings comprising a dry blend of at least powder coatings each comprising a binder resin on the basis of a carboxyl-terminated polyester resin (a) having an acid value from 20 to 200 mg KOH/g, preferably between 20 and 120 KOH/g, a glass transition temperature of at least 40° C., and a b-hydroxyalkylamide (b) with at least two b-hydroxy- alkylamide groups per molecule, and optionally further typical additives dictated by processing and usage, wherein the at least two binder resins differ in functionality, or in other words in the number of carboxyl and/or b-hydroxyalkylamide groups per molecule.

Such object is further achieved by a process for preparing such a heat-curable, epoxy-free coating composition, characterized in that the components (a), (b) and optionally further typical additives for powder coatings, in particular pigments, fillers, wetting, flow-control or degassing agents, heat- or UV-stabilizers and the like, are extruded separately in the melt at 80° to 130° C. for each binder and cooled, ground, and screened to a particle size of less than 90 mm, and the thus- produced powder coating materials are mixed in an intensive mixer into a dry blend of the two or more binders.

The invention therefore relates in particular to a dry blend of a plurality of powder coating materials on the basis of chemically identical systems, namely carboxyl-terminated polyester resins and β-hydroxyalkylamides as cross-linking agents, which differ in functionality.

In contrast to the aforementioned EP '363 and WO '545, by the process of the invention, or in other words by dry-blending of prepared powdered paints on the basis of carboxyl-terminated polyester resins and β-hydroxyalkylamides with different functionality, powder coatings with optically very attractive but matt surfaces and a gloss index under DIN 67530 (60°) of<40 can be obtained. The gloss index can be reduced still further if the carboxyl-terminated polyester resins used also have a different functionality.

DETAILED DESCRIPTION OF EMBODIMENTS

Polyester resins that are suitable as carboxyl- terminated polyester resins for the coating composition according to the invention are those that have acid values of from 20 to 200 mg KOH/g, preferably between 20 and 120, hydroxyl numbers less than 10 mg KOH/g, and glass transition temperatures of >40° C.

The preparation of these carboxyl-terminated polyester resins is done by known processes, by esterification or re-esterification of di- and/or multivalent linear or branched aliphatic or cycloaliphatic polyols with multivalent, preferably di-valent aliphatic, cycloaliphatic or aromatic carboxylic acids or the esters thereof, in the presence of an esterification or reesterification catalyst at temperatures up to approximately 250° C. and toward the end at reduced pressure.

Preferred polyols are 2,2-dimethyl-1,3-propanediol (neopentyl glycol), ethylene glycol, 1,4-butanediol, 1,6-hexanediol, 1,4-dimethylolcyclohexane, 2,2-[bis(4-hydroxycyclohexyl)]propane, diethylene glycol, dipropylene glycol, glycerin, pentaerythritol, and others. Preferably, the polyol component contains at least 50 mol % neopentyl glycol.

Preferred multivalent carboxylic acids are terephthalic acid, isophthalic acid, trimellitic acid, adipic acid, 1,4-cyclohane dicarboxylic acid, and others. The functionality of the carboxyl-terminated polyester resins is adjusted by way of the ratio between divalent and more than divalent polyols or carboxylic acids.

The b-hydroxyalkylamides of the coating composition according to the invention must contain at least two b-hydroxyalkylamide groups per molecule, and they are essentially characterized by the following formula (I):

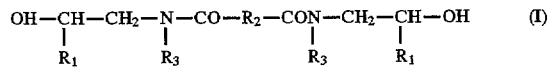

in which

R$_1$ stands for identical or different alkyl radicals having from 1 to 4 carbon atoms, or hydrogen R$_2$ stands for an aliphatic, cycloaliphatic, araliphatic or aromatic radical;

R$_3$ stands for

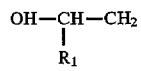

or identical or different alkyl radicals having from 1 to 4 carbon atoms, or hydrogen.

Especially preferred B-hydroxyalkylamides are:

N,N'-di(β-hydroxyethyl)acetamide
bis(β-hydroxyethyl)adipamide
bis(β-hydroxypropyl)adipamide
bis[N,N'-di(β-hydroxyethyl)adipamide
bis[N,N'-di(B-hydroxypropyl)adipamide The preparation of the B-hydroxyalkylamides is done in a known manner by reacting the esters of the corresponding carboxylic acid with alkanolamines in the presence of heat.

To attain good technical painting properties, the ratio of β-hydroxyalkylamide groups to the carboxyl groups of the carboxyl-terminated polyester resins of the invention is advantageously between 0.5 and 1.5, preferably between 0.8 and 1.2.

The epoxy-free, heat-curable and toxicologically unobjectionable coating composition according to the invention thus comprises a dry blend of at least two binder systems on the basis of a carboxyl-terminated polyester with an acid value of from 20 to 200 mg KOH/g, preferably from 20 to 120 mg KOH/g and a glass transition temperature of at least 40° C., a β-hydroxylalkylamide with more than two β-hydroxylalkylamide groups or mixtures thereof with different functionality, and optionally further additives typical for powder coatings, such as wetting, flow control or degassing agents, heat- or UV-stabilizers, pigments, colorants, fillers, etc., where the two binder systems differ in their functionality and consequently in their reactivity.

The preparation of each of the binder systems required for the coating composition according to the invention is preferably done in the melt by coextrusion of all the components of such binder system at temperatures between 80° and 130° C. The extrudate is then cooled, ground, and screened to a particle size of <90 mm. To attain the effect according to the invention, namely the development of matt surfaces with a gloss index (DIN 67530) of <60, prefered of <40, at an angle of incidence of 60°, the two or more prepared powders, which differ in functionality and reactivity, are mixed in an intensive mixer to make a dry blend. The attainable gloss index depends on the mixture ratio of the various, preferably two, resin powders, and in most cases is lowest when the proportions by weight are equal. In general, the mixture ratio should not deviate from 1:1 by more than about 25%, although for economic reasons one of the components may be present in an even greater or lesser amount.

The use of the coating compositions according to the invention is done by the usual processes for powder coatings, such as by means of an electrostatic powder coating spray device, by the triboelectric or corona process, or by the fluidized bed process, and so forth.

The coating system or composition according to the invention has good storage stability at normal ambient temperatures, and after cross-linking between 150° and 220° C. exhibits good mechanical properties and has smooth surfaces amd the low gloss indexes described.

The examples and Tables 1 and 2 characterize the preparation of the binder components and the properties of the coating composition according to the invention.

EXAMPLE 1

Polyester A 406.2 g (3.90 mols) of neopentyl glycol and 19.2 g (0.31 mols) of ethylene glycol are placed in a two-liter esterification reactor, equipped with a temperature sensor, agitator, reflux column and distillation bridge, and melted at 140° C., in an N$_2$ atmosphere that is maintained for the entire reaction time. With agitation being continued, 616.0 g (3.71 mols) of terephthalic acid and 0.6 g of esterification catalyst are then added. After the internal temperature is raised in increments, the reaction is continued until such time as no further distillate appears. Next, 100.0 g (0.60 mols) of isophthalic acid and 13.3 g (0.09 mols) of adipic acid are added and esterified until the desired acid value range from 30 to 36 mg KOH/g is reached. A portion of this second stage is optionally carried out at reduced pressure (less than 100 mbar). The polyester obtained has an acid value of 34 mg KOH/g, an ICI melt viscosity at 160° C. of 37 Pas and a glass transition temperature TG (DSC) of 64° C. The carboxyl functionality is 2.0.

EXAMPLE 2

Polyester B

Analogously to Example 1, in a first stage 417.2 g (4.00 mols) of neopentyl glycol, 19.2 g (0.31 mols) of ethylene glycol and 600.0 g (3.61 mols) of terephthalic acid are esterified. As the second stage, 86.2 g (0.52 mols) of isophthalic acid and 33.5 g (0.23 mols) of adipic acid are added. The polyester obtained by the process described in Example 2 has an acid value of 22 mg KOH/g, an ICI melt viscosity at 160° C. of 53 Pas, and a TG (DSC) of 63° C. The carboxyl functionality is 2.0.

EXAMPLE 3

Polyester C

Analogously to Example 1, in a first stage 320.0 g (3.07 mols) of neopentyl glycol, 57.0 g (0.92 mols) of ethylene glycol, 31.0 g (0.23 mols) of trimethylol propane, 572.0 g (3.44 mols) of terephthalic acid, and 38.5 g (0.23 mols) of isophthalic acid are esterified. As the second stage, 94.0 g (0.57 mols) of isophthalic acid and 54.0 g (0.37 mols) of adipic acid are added. The polyester obtained by the process described in Example 3 has an acid value of 51 mg KOH/g, an ICI melt viscosity at 160° C. of 32 Pas, and a TG (DSC) of 58° C. The carboxyl functionality is 2.4.

EXAMPLE 4

Bis(β-hydroxyethyl)adipamate 348 g (2 mols) of dimethyladipate and 244 g (4 mols) of ethanolamine are heated in an $N_2$ atmosphere in a reaction vessel, equipped with an agitator, thermometer and distillation attachment, to 110° C. and reacted in reflux for 15 minutes. Next, at the same temperature, the reaction is continued for approximately 3 h with removal of the split-off methanol, and after that the temperature is raised to approximately 148° C. The contents of the reaction vessel are then, after a further 90 minutes in an $N_2$ atmosphere, poured into a porcelain dish and after solidifying are ground. The product obtained has a melting point of from 117° to 120° C. and still contains approximately 1% free ethanolamine.

EXAMPLE 5

Preparation of the powder coating

For each of the coating powders 1–5 described in Table 1, where parts are given in parts by weight, the following production process is employed:

The ingredients for each formulation are mixed dry in a Henschel mixer for 30 seconds at 700 rpm and then extruded in a Buss-Co kneader (PLK 46), with a jacket temperature of 100° C., a cooled screw, and a screw speed of 150 rpm. The extrudate is cooled, ground, and screened to <90 μm, thereby providing the five different coating powders 1–5 as shown in Table 1, below.

TABLE 1

|  | 1 | 2 | 3 | 4 | 5 |
| --- | --- | --- | --- | --- | --- |
| Polyester A | 55,7 | 55,7 |  |  |  |
| Polyester B |  |  | 56,9 | 56,9 |  |
| Polyester C |  |  |  |  | 54,3 |
| Primid XL 552[1] | 0,98 | 0,74 | 0,63 | 0,47 | 4,7 |
| Bis(β-hydroxyethyl)adipamate | 2,7 | 2,85 | 1,74 | 1,95 |  |
| Titanium oxide (Kronos 2160) | 40 | 40 | 40 | 40 | 40 |

TABLE 1-continued

|  | 1 | 2 | 3 | 4 | 5 |
| --- | --- | --- | --- | --- | --- |
| Resiflow PV 88[2] | 0,5 | 0,5 | 0,5 | 0,5 | 0,5 |
| Benzoin | 0,2 | 0,2 | 0,2 | 0,2 | 0,2 |
| Gelation time at 200° C. | 1' 31" | 6' 25" | 42" | 7' 20" | 25" |

[1] Bis[N,N'-Di(β-hydroxyethyl)]adipamate
Commercial Product of Rohm and Haas
[2] Flow Agent on Polyacrylate Basis
Commercial Product of Worlee-Chemie GmbH The coating compositions D1–D4 according to the invention for producing dried coatings with matt surfaces, listed in Table 2 below are prepared by intensive mixing together in a Henschel mixer of two of the various ready-made coating powders 1–5 disclosed in Table 1 of differing functionality. Parts are given in parts by weight in Table 2. Painting tests and evaluation of the surfaces are done on steel panels (0.8 mm thick), degreased with trichloroethane, at a curing temperature of 200° C. for 30 minutes and a film thickness of 60 to 80 mm.

TABLE 2

Technical Paint Properties of Cured Powdered Paint

|  | D 1 | D 2 | D 3 | D 4 |
| --- | --- | --- | --- | --- |
| Coating Powder 1 | 50 |  |  |  |
| Coating Powder 2 |  | 50 |  |  |
| Coating Powder 3 |  |  | 50 |  |
| Coating Powder 4 |  |  |  | 50 |
| Coating Powder 5 | 50 | 50 | 50 | 50 |
| impact reverse (inch pounds) ASTM 2794 | 160 | 160 | 160 | 160 |
| Erichsen penetration Index DIN 53150 | 10 | 10 | 10 | 10 |
| Gloss Index DIN 67530, 60° | 38 | 38 | 30 | 32 |

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A heat-curable, epoxy-free powder coating composition for preparing matt coatings, comprising
   a dry blend of at least two different coating powders, each said coating powder comprising a binder resin comprised of
   (a) a carboxyl-terminated polyester resin having an acid value from 20 to 200 mg KOH/g and a glass transition temperature of at least 40° C., and
   (b) a β-hydroxyalkylamide component selected from the group consisting of
      (i) a β-hydroxyalkylamide with at least two β-hydroxyalkylamide groups per molecule,
      (ii) a mixture of at least two multifunctional β-hydroxyalkylamides, and (iii) a mixture of (i) and (ii), and wherein said binder resins of said at least two coating powders differ from one another in (1) the number of carboxyl groups per binder resin molecule, (2) the number of β-hydroxyalkylamide groups per binder resin molecule, or (3) both the number of carboxyl groups per binder resin molecule and the number of β-hydroxylalkylamide groups per binder resin molecule.

2. A composition according to claim 1, wherein in at least one of said binder resins, the carboxyl-terminated polyester resin has an acid value between 20 and 120 KOH/g.

3. A coating composition according to claim 1, wherein in at least one of said binder resins, the ratio of carboxyl groups of said carboxyl-terminated polyester resin (a) to the number of β-hydroxyalkylamide groups is 1:0.5 to 1:1.5.

4. A coating composition according to claim 3, wherein said ratio is 1:0.8 to 1:1.2.

5. A coating composition according to claim 1, wherein said β-hydroxyalkylamide (b) consists of said component (i) having at least two β-hydroxyalkylamide groups.

6. A coating composition according to claim 1, wherein, in at least one of said binder resins, said β-hydroxyalkylamide (b) comprises a mixture of di- and multi-functional β-hydroxyalkylamides.

7. The coating composition of claim 1, wherein the carboxyl-terminated polyester resin (a) of at least one of said binder resins comprises at least one multi-valent linear or branched, aliphatic or cycloaliphatic polyol, and at least one multi-valent aliphatic, cycloaliphatic or aromatic carboxylic acid.

8. A process for preparing a heat-curable, epoxy-free coating composition according to claim 1, comprising forming each said binder resin into a powder by mixing the components (a), (b) and optionally pigments, fillers, wetting, flow-control or degassing agents, heat- and UV-stabilizers for each said binder resin to obtain a binder resin mixture; extruding the binder resin mixture; cooling the extruded binder resin; grinding the cooled resin binder into particles; and screening the binder resin particles to form a binder resin powder having a particle size of less than 90 mm; followed by mixing the resultant binder resin powders together into a dry blend.

9. A cured coating having a gloss index of less than 40 at an angle of 60° formed from the heat-curable, epoxy-free coating composition produced by the process of claim 8, wherein said cured coating is produced by forming a film from said coating composition and heat-curing said film.

10. In a method of providing a coating on a substrate by applying a resinous powder coating composition to said substrate and fusing said powder to said substrate, the improvement wherein said powder comprises the heat-curable, epoxy-free coating composition produced by the process of claim 8, said resultant coating having a gloss index of less than 40 at an angle of 60°.

11. A method according to claim 10 in which said coating method is carried out by triboelectic coating, corona powder spraying, or a fluidized bed application.

12. A coated substrate made by the method of claim 11.

13. A coated substrate made by the method of claim 10.

14. In a method of providing a coating on a substrate by applying a resinous powder coating composition to said substrate and fusing said powder to said substrate, the improvement wherein said powder comprises a composition according to claim 1.

15. A method according to claim 14 in which said coating method is carried out by triboelectic coating, corona powder spraying, or a fluidized bed application.

16. A coated substrate made by the method of claim 15.

17. A coated substrate made by the method of claim 14.

18. A coated substrate comprising a substrate and a coating thereon, said coating constituting a heat-cured epoxy-free coating formed from the heat-curable, epoxy-free powder composition of claim 1, wherein said coating has a gloss index of less than 40 at angle of 60°.

19. The heat-curable, epoxy-free powder coating composition of claim 1, wherein said binder resins of said at least two coating powders differ from one another in the number of β-hydroxyalkylamide groups per binder resin molecule, or both the number of carboxyl groups per binder resin molecule and the number of β-hydroxyalkylamide groups per binder resin molecule.

20. A heat-curable, epoxy-free powder coating composition for preparing matt coatings, comprising a dry blend of at least two different coating powders, each said coating powder comprising a binder resin comprised of (a) a carboxyl-terminated polyester resin having an acid value from 20 to 200 mg KOH/g and a glass transition temperature of at least 40° C., and (b) a β-hydroxyalkylamide component selected from the group consisting of
(i) a β-hydroxyalkylamide with at least two β-hydroxyalkylamide groups per molecule,
(ii) a mixture of at least two multifunctional β-hydroxyalkylamides, and
(iii) a mixture of (i) and (ii), and wherein one of said binder resins comprises a different β-hydroxyalkylamide than a second of said binder resins.

* * * * *